US007012818B2

(12) United States Patent
Kotsuji et al.

(10) Patent No.: US 7,012,818 B2
(45) Date of Patent: Mar. 14, 2006

(54) SWITCHING POWER SUPPLY DEVICE

(75) Inventors: Hirotaka Kotsuji, Sakai (JP); Saburou Kitano, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 142 days.

(21) Appl. No.: 10/745,998

(22) Filed: Dec. 29, 2003

(65) Prior Publication Data

US 2004/0141339 A1 Jul. 22, 2004

(30) Foreign Application Priority Data

Jan. 7, 2003 (JP) ............................ 2003-000975

(51) Int. Cl.
*G05F 3/335* (2006.01)

(52) U.S. Cl. .............................. 363/21.01; 363/21.04; 363/65; 363/89

(58) Field of Classification Search ............ 363/21.01, 363/21.04, 21.08, 65, 89
See application file for complete search history.

(56) References Cited

U.S. PATENT DOCUMENTS 5,771,160 A * 6/1998 Seong ......................... 363/20
5,856,917 A * 1/1999 Aonuma et al. ......... 363/21.04
5,909,360 A * 6/1999 Lavin et al. .................. 307/66
6,002,596 A * 12/1999 Mayer et al. ............ 363/21.04
6,031,748 A * 2/2000 Hong .......................... 363/89
6,172,885 B1 * 1/2001 Feldtkeller ................. 363/21.1
6,344,986 B1 * 2/2002 Jain et al. ...................... 363/89
6,504,497 B1 * 1/2003 Jang et al. .................. 341/125
6,714,425 B1 * 3/2004 Yamada et al. .......... 363/21.12
6,775,156 B1 * 8/2004 Lin et al. ................. 363/21.01

FOREIGN PATENT DOCUMENTS

JP 2001-095236 4/2001

* cited by examiner

*Primary Examiner*—Jeffrey Sterrett
(74) *Attorney, Agent, or Firm*—Birch, Stewart, Kolasch & Birch, LLP

(57) ABSTRACT

In a switching power supply device, the operating voltage is supplied to the power-factor improvement control circuit when the switching power supply device is operating under normal operating load. Thereby, the booster chopper circuit is controlled by the power-factor improvement control circuit so as to improve the power factor of the device. By contrast, during the non-oscillation period while the switching control circuit is in the intermittent oscillation mode when the power consumption is small, the voltage induced in the auxiliary winding drops. Accordingly, the voltage of the auxiliary power supply also drops. Furthermore, when the driving voltage to be supplied to the power-factor improvement control circuit is reduced below the operating voltage thereof by the voltage reduction circuit, the power-factor improvement control circuit stops functioning, thereby reducing power consumption accordingly.

8 Claims, 12 Drawing Sheets

SWITCHING POWER SUPPLY DEVICE

This nonprovisional application claims priority under 35 U.S.C. § 119(a) on Patent Application No. 2003-000975 filed in JAPAN on Jan. 7, 2003, which is herein incorporated by reference.

BACKGROUND OF THE INVENTION

1. Field of the Invention

The present invention relates to a switching power supply device used as a DC power source for electrical appliances.

2. Description of the Prior Art

Recently, electrical appliances such as a facsimile, a telephone set, a copying machine, other office automation equipment, home electrical appliances, or the like that require a supply of electricity during a standby period in addition to an operation period have been on the rise. Because these electrical appliances need a stable constant operating voltage, a switching power supply device capable of outputting a stabilized voltage has been used. Against the background of energy conservation in recent years, in addition to reducing the power consumed by the switching power supply device, it has become increasingly important to reduce the power consumed during the standby period that accounts for a larger proportion of time than the operating period itself for such electrical appliances that require the power at all times.

The switching power supply device itself converts an alternating-current (AC) voltage to a direct-current (DC) voltage by rectifying the AC voltage through a rectifying circuit thereof and by smoothing a resultant undulating voltage through a smoothing circuit thereof. The DC voltage thus obtained is switched on and off by a switching element and fed to an output rectifying smoothing circuit for rectifying and smoothing processes to obtain any given predetermined DC voltage.

In such a switching power supply device as mentioned above, if the smoothing circuit at an input side is a capacitor-input type, there is a problem in which a power factor is reduced, because the input current flows only when a rectified voltage becomes higher than a charged voltage of an input smoothing capacitor and a conduction angle of an input current becomes smaller accordingly. To solve this problem, switching power supply devices equipped with a booster chopper circuit having a power-factor improvement function have been conventionally used.

Also, the Japanese Patent Application Laid-Open No. 2001-95236 discloses a switching power supply device that has a power-factor improvement function by using an output power sensing circuit for outputting a control signal so that the power-factor improvement function of a booster chopper circuit thereof is deactivated when the output power is less than a predetermined amount and that the power-factor improvement function of the booster chopper circuit thereof is activated when the output power is more than the predetermined amount.

These conventional switching power supply devices equipped with the booster chopper circuit having the power-factor improvement function contribute to reducing the power consumption, because a reactive power is reduced by the improved power factor. However, in comparison with a switching power supply device having no power-factor improvement function, these conventional switching power supply devices give rise to a loss of power required for operating the power-factor improvement function of the booster chopper circuit and a power conversion efficiency thereof drops accordingly. The conventional switching power supply devices waste unnecessary power by operating the power-factor improvement function, particularly in a low-power consumption state in which improvement of the power factor is not necessary during such a period as a standby period of the electrical appliances.

The conventional technology disclosed in the Japanese Patent Application Laid-Open No. 2001-95236 is capable of preventing the wasteful power required for the operation of the power-factor improvement function from being consumed by stopping the operation of the power-factor improvement function in the low-power consumption state. To do so, the switching power supply device requires an output power sensing circuit for detecting the low-power consumption state and a power-factor improvement function control circuit for stopping the power-factor improvement function according to a control signal fed from the output power sensing circuit, which, in return, causes the circuitry to become complicated.

SUMMARY OF THE INVENTION

An object of the present invention is to solve the above problems and to provide a switching power supply device capable of stopping operating a power-factor improvement control circuit in a low-power consumption state and contributing further to power savings.

To achieve the above object, according to one aspect of the present invention, there is provided a switching power supply device comprising a booster chopper circuit for receiving a first DC voltage and converting the first DC voltage to a second DC voltage for outputting, the booster chopper circuit including a power-factor improvement control circuit for improving a power factor, a series circuit to which the second DC voltage is supplied and comprising a primary winding of a transformer and a switching element, a switching control circuit for performing an oscillation function so as to drive and control the switching element so that a secondary winding of the transformer induces a voltage that is then rectified, smoothed, and supplied to a load as a third DC voltage, the switching control circuit for performing also, when the load is smaller than a predetermined value, an intermittent-oscillation function by which an oscillation period and a non-oscillation period are repeated, an auxiliary power supply for supplying a voltage induced in an auxiliary winding of the transformer when the switching element is driven by the switching control circuit as a driving voltage by processing the induced voltage through rectifying and smoothing to the power-factor improvement control circuit and the switching control circuit, and a voltage reduction circuit for lowering the driving voltage, wherein, during the non-oscillation period when the load is smaller than the predetermined value and the switching control circuit is performing the intermittent-oscillation function, the driving voltage supplied to the power-factor improvement control circuit drops below an operating voltage thereof through a voltage drop caused by the voltage reduction circuit and causes the power-factor improvement control circuit to stop operating so that power consumption is reduced.

According to another aspect of the present invention, in the switching power supply device under normal operating load, the operating voltage is supplied to the power-factor improvement control circuit. Thereby, the booster chopper circuit is controlled by the power-factor improvement control circuit so as to improve the power factor of the device. By contrast, during a non-oscillation period while the switching control circuit is in an intermittent oscillation mode when the power consumption is small, the voltage induced in the auxiliary winding drops. Accordingly, the voltage of the auxiliary power supply also drops. Furthermore, when the driving voltage to be supplied to the power-factor improvement control circuit is reduced below the operating voltage thereof by the voltage reduction circuit, the power-factor improvement control circuit stops functioning, thereby reducing the power consumption accordingly.

According to still another aspect of the present invention, there is provided a switching power supply device in which the auxiliary power supply comprises a first auxiliary power supply for driving the power-factor improvement control circuit and a second auxiliary power supply for driving the switching control circuit. As a result, voltages to be supplied to the switching control circuit and the power-factor improvement circuit respectively do not interfere with each other, and thereby an easy controlling is made possible.

According to yet another aspect of the present invention, there is provided a switching power supply device in which a voltage across the auxiliary winding is fed to the second auxiliary power supply and a voltage fed from a tap arranged on the auxiliary winding is fed to the first auxiliary power supply, and the voltage reduction circuit is arranged in between the power-factor improvement control circuit and the first auxiliary power supply. According to this configuration, it is possible to reduce unnecessary power consumed by the voltage reduction circuit.

According to another aspect of the present invention, there is provided a switching power supply device in which a voltage across the auxiliary winding is fed to the first auxiliary power supply and a voltage fed from a tap arranged on the auxiliary winding is fed to the second auxiliary power supply, and the voltage reduction circuit is arranged in between the power-factor improvement control circuit and the first auxiliary power supply. According to this configuration, it is possible to reduce unnecessary power consumed by the switching control circuit.

According to still another aspect of the present invention, there is provided a switching power supply device in which a voltage across the auxiliary winding is fed to the second auxiliary power supply and a voltage fed from a tap arranged on the auxiliary winding is fed to the first auxiliary power supply. Therefore, it is possible to reduce the driving voltage to be supplied to the power-factor improvement control circuit below the operating voltage thereof and stop operating the power-factor improvement control circuit.

According to yet another aspect of the present invention, the voltage reduction circuit comprises a Zener diode for lowering the driving voltage. Therefore, it is possible to choose a Zener diode having a specific Zener voltage equal to the required voltage drop. This will make the circuit design easier.

According to another aspect of the present invention, the voltage reduction circuit comprises a resistor for lowering the driving voltage. Accordingly, the circuit is made simpler and the cost thereof can be reduced.

According to another aspect of the present invention, the voltage reduction circuit comprises a resistor, connected in parallel with a diode that forms the first auxiliary power supply, for lowering the driving voltage. Accordingly, the circuit is made simpler and the cost thereof can be reduced.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
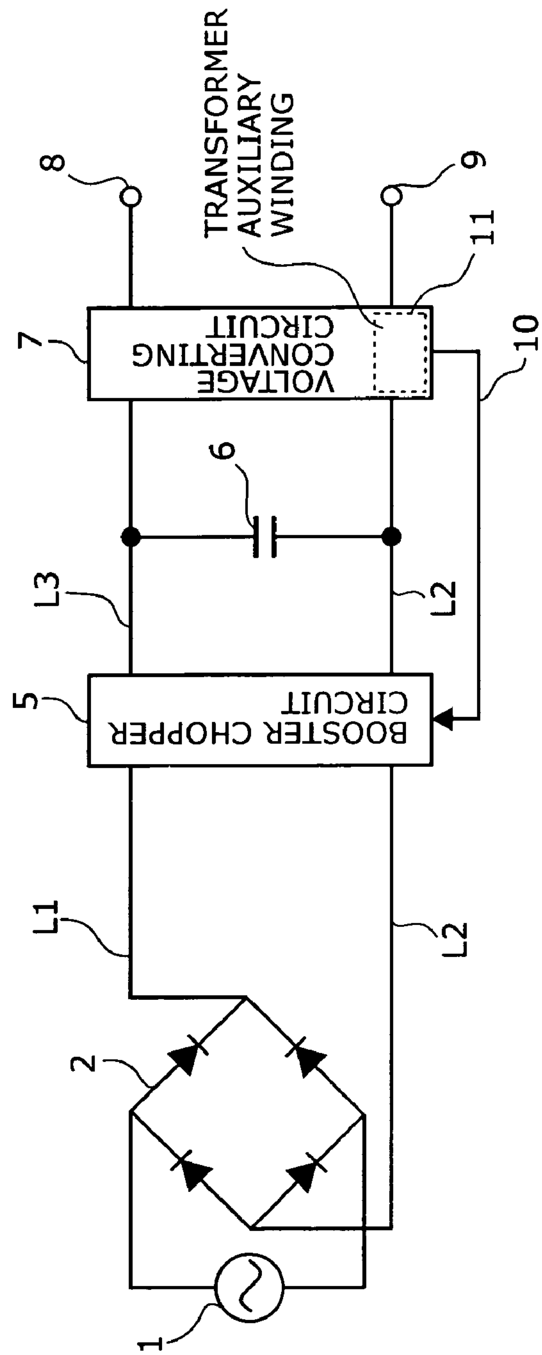
FIG. 1 is a circuit block diagram showing a configuration of a switching power supply device embodying the invention.

Hereinafter, embodiments of the present invention will be described with reference to the accompanying drawings. FIG. 1 is a circuit block diagram showing a configuration of a switching power supply device embodying the invention. This switching power supply device has a circuit configuration for achieving low power consumption through an intermittent oscillating operation, and comprises a bridge rectifier 2 for performing a full-wave rectification on an AC voltage fed from an AC power source 1; a booster chopper circuit 5 having a power-factor improvement function, connected to output terminals of the bridge rectifier 2 through a positive line L1 and a negative line L2 respectively, for boosting the rectified output fed from the bridge rectifier 2 by using a chopper control and; a smoothing capacitor 6, connected between a positive line L3 and the negative line L2, for smoothing an output fed from the booster chopper circuit 5; a voltage converting circuit 7 having an auxiliary winding 11 of an unillustrated transformer or the like and connected between the positive line L3 and the negative line L2; and a positive output terminal 8 and a negative output terminal 9 for feeding a voltage supplied from the voltage converting circuit 7 to an unillustrated load.

A voltage induced in the auxiliary winding 11 is rectified and smoothed by an unillustrated diode and an unillustrated capacitor and supplied to the booster chopper circuit 5 as an auxiliary power source 10. When the load is light, the rectified and smoothed voltage drops. Based on this theory, it is possible to stop the power-factor improvement function of the booster chopper circuit 5 when the load is light by reducing the voltage to such a voltage with which the booster chopper circuit 5 stops operating. As a result, the output voltage of the bridge rectifier 2 is fed intact to the smoothing capacitor 6. Power-factor and power-loss characteristics during this operation are equal to those of a switching power supply device that has no power-factor improvement function.

Figure 2:
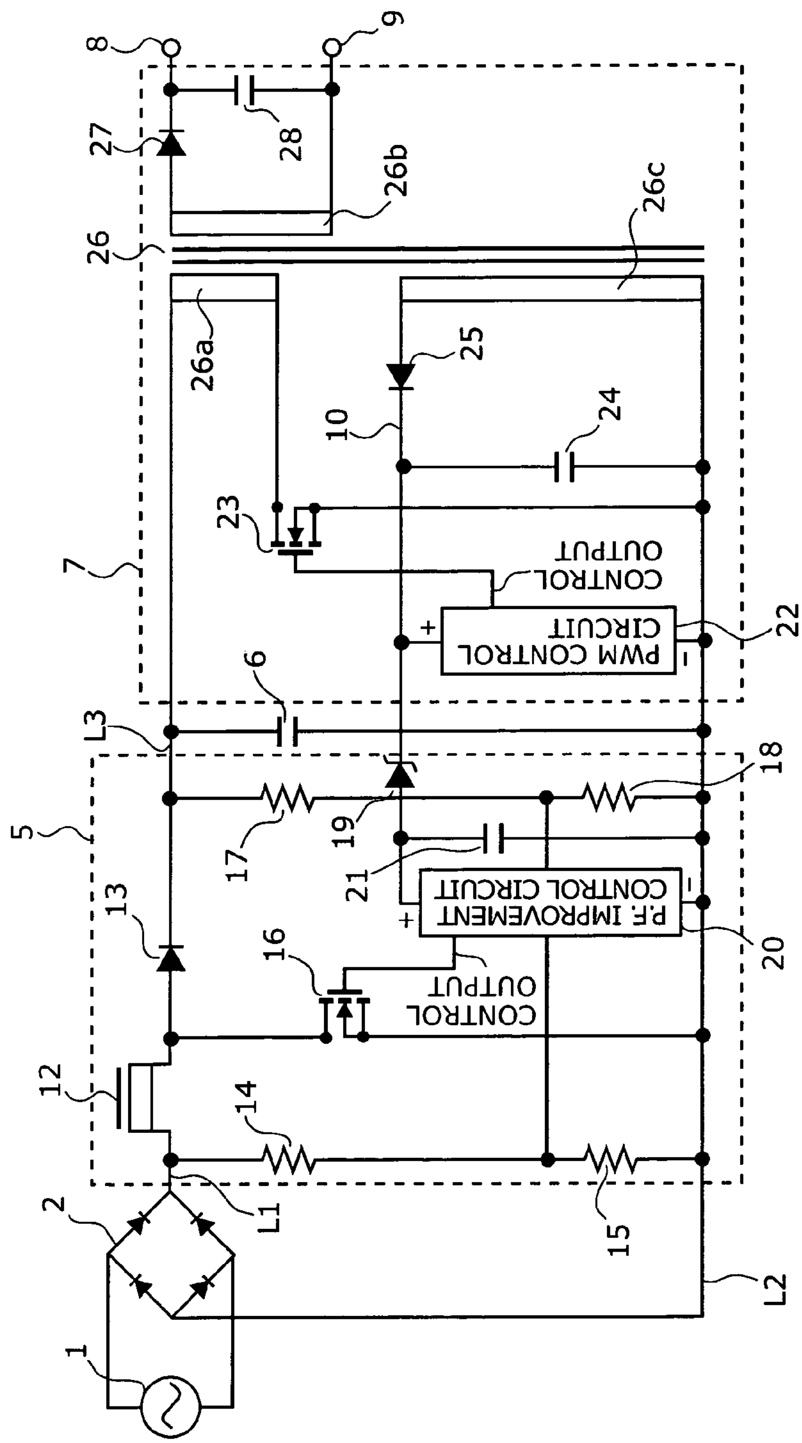
FIG. 2 is a circuit diagram of a first embodiment showing a specific configuration of the switching power supply device shown in FIG. 1.

FIG. 2 is a circuit diagram of a first embodiment showing a specific configuration of the switching power supply device shown in FIG. 1. This switching power supply device employs a flyback converter circuit in accordance with a PWM (Pulse Width Modulation) control system. This switching power supply device comprises a bridge rectifier 2, a booster chopper circuit 5, a smoothing capacitor 6, and a voltage converting circuit 7.

An AC power source 1 is connected to an input side of the bridge rectifier 2, and a positive line L1 and a negative line L2 are connected to an output side of thereof. A series circuit comprising resistors 14 and 15 is connected between the positive line L1 and the negative line L2. The positive line L1 is connected to a positive line L3 by way of a chopper coil 12 and a diode 13. An FET 16 is connected between a connection point of the copper coil and the diode 13 and the negative line L2. The smoothing capacitor 6 and a series circuit comprising resistors 17 and 18 are connected between the positive line L3 and the negative line L2.

A transformer 26 has a primary winding 26*a*, a secondary winding 26*b*, and an auxiliary winding 26*c*. One end of the primary winding 26*a* is connected to the positive line L3 and another end thereof is connected to the negative line L2 through the FET 23. One end of the secondary winding 26*b* is connected a positive output terminal 8 through a diode 27 and another end thereof is connected to a negative output terminal 9. A smoothing capacitor 28 is connected between the positive output terminal 8 and the negative output terminal 9.

One end of the auxiliary winding 26*c* is connected to a "+" power terminal and a cathode of a Zener diode 19 through a diode 25, and another end thereof is connected to the negative line L2. A gate of the FET 23 is connected to a control output terminal of a PWM control circuit 22. A smoothing capacitor 24 is connected between a cathode of the diode 25 and the negative line L2. One end of a smoothing capacitor 21 and an anode of the Zener diode 19 are connected to a "+" power terminal of a power-factor improvement control circuit 20. A gate of the FET 16 is connected to a control output terminal of the power-factor improvement control circuit 20. A "−" power terminal of the power-factor improvement control circuit 20 and a "−" power terminal of the PWM control circuit 22 are connected to the negative line L2.

When the AC power source 1 is connected to this switching power supply device, a rectified voltage is fed from the bridge rectifier 2. Because the power-factor improvement control circuit 20 is not operating at this moment, said rectified voltage is fed intact to the smoothing capacitor 6.

When an unillustrated startup power source charges the smoothing capacitor 24 and a voltage across the smoothing capacitor 24 becomes equal to or higher than a predetermined voltage, then the PWM control circuit 22 starts operating. The FET 23 is driven by the PWM control circuit 22 and performs an on-off control of current flowing through the primary winding 26*a* of the transformer 26. As a result, a voltage is induced in the secondary winding 26*b* of the transformer 26. Thus induced voltage is rectified and smoothed by the diode 27 and the smoothing capacitor 28 during an off-state of the FET 23 and fed to an unillustrated load as a supply voltage from the positive output terminal 8 and the negative output terminal 9.

An unillustrated output voltage detection circuit detects a voltage between the positive output terminal 8 and the negative output terminal 9 and feeds the detected voltage to the PWM control circuit 22 by way of an unillustrated photo-coupler. In this way, the PWM control circuit 22 controls the FET 23 so as to regulate an output voltage between the positive output terminal 8 and the negative output terminal 9. When the FET 23 is driven, a voltage is induced in the auxiliary winding 26*c* of the transformer 26. Resulting current from the induced voltage is rectified and smoothed by the diode 25 and the smoothing capacitor 24, and supplied to the PWM control circuit 22 as an auxiliary power 10. Therefore, during a steady operation, the PWM control circuit 22 operates on the voltage supplied from the auxiliary power 10, and drives the FET 23.

When a Zener voltage of the Zener diode 19 and the auxiliary winding 26*c* are set in such a way that a voltage fed from the auxiliary winding 26*c* and rectified and smoothed by the diode 25 and the smoothing capacitor 24 becomes higher than a sum of the Zener voltage of the Zener diode 19 and an operating voltage of the power-factor improvement control circuit 20, then power required for operating the power-factor improvement control circuit 20 is supplied thereto. As a result, the booster chopper circuit 5 comes into operation and improves the power factor of the switching power supply device.

Furthermore, when the switching power supply device is operating in a low-power consumption state and the PWM control circuit 22 is in an intermittent oscillation mode, in a period during which the PWM control circuit 22 stops functioning, the voltage induced in the auxiliary winding 26*c* drops. When this voltage is further reduced by being consumed as the Zener voltage of the Zener diode 19 and by the smoothing capacitor 21 and becomes lower than the operating voltage of the power-factor improvement control circuit 20, the power-factor improvement control circuit 20 stops functioning. In this way, the power loss can be further reduced. In other words, in this switching power supply device, an additional reduction of the power consumption can be achieved by stopping operating the power-factor improvement control circuit 20 during the low-power consumption state in which an improvement of the power factor is not required.

Figure 3:
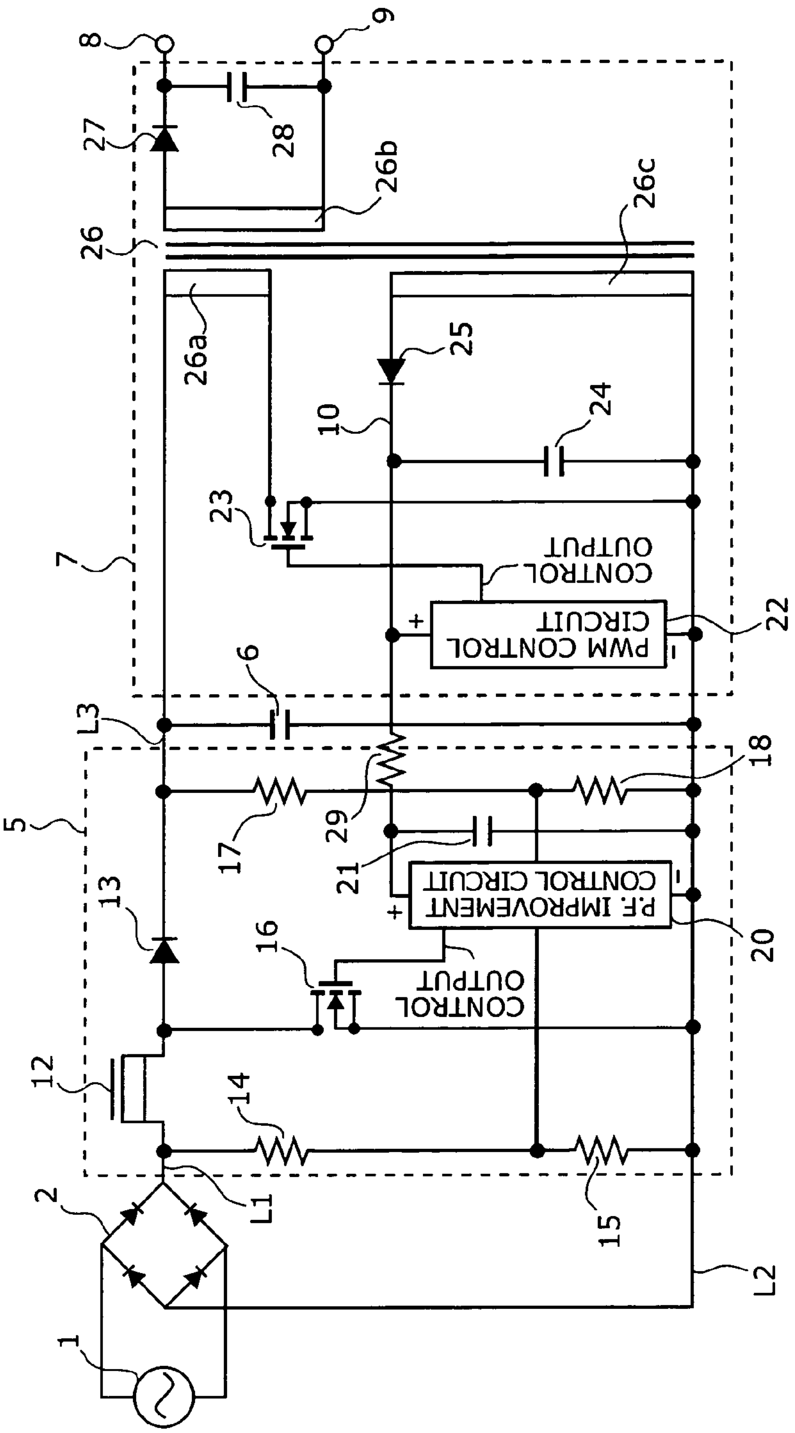
FIG. 3 is a circuit diagram of a second embodiment showing a specific configuration of the switching power supply device shown in FIG. 1.

FIG. 3 is a circuit diagram of a second embodiment showing a specific configuration of the switching power supply device shown in FIG. 1. In FIG. 3, such components as are found also in FIG. 2 are identified with the same reference symbols or numerals and descriptions thereof are not repeated accordingly.

A switching power supply device shown in FIG. 3 has a resistor 29 that replaces the Zener diode 19 of the switching power supply device shown in FIG. 2. When this switching power supply device is operating in a low-power consumption state and a PWM control circuit 22 is in an intermittent oscillation mode, in a period during which the PWM control circuit 22 stops functioning, a voltage induced in an auxiliary winding 26*c* drops. When this voltage is further reduced by being consumed as a voltage drop across the resistor 29 and by the smoothing capacitor 21 and becomes lower than an operating voltage of a power-factor improvement control circuit 20, the power-factor improvement control circuit 20 stops functioning. In this way, the power loss can be further reduced. In other words, in this switching power supply device, an additional reduction of the power consumption can be achieved by stopping operating the power-factor improvement control circuit 20 during the low-power consumption state in which an improvement of the power factor is not required.

Figure 4:
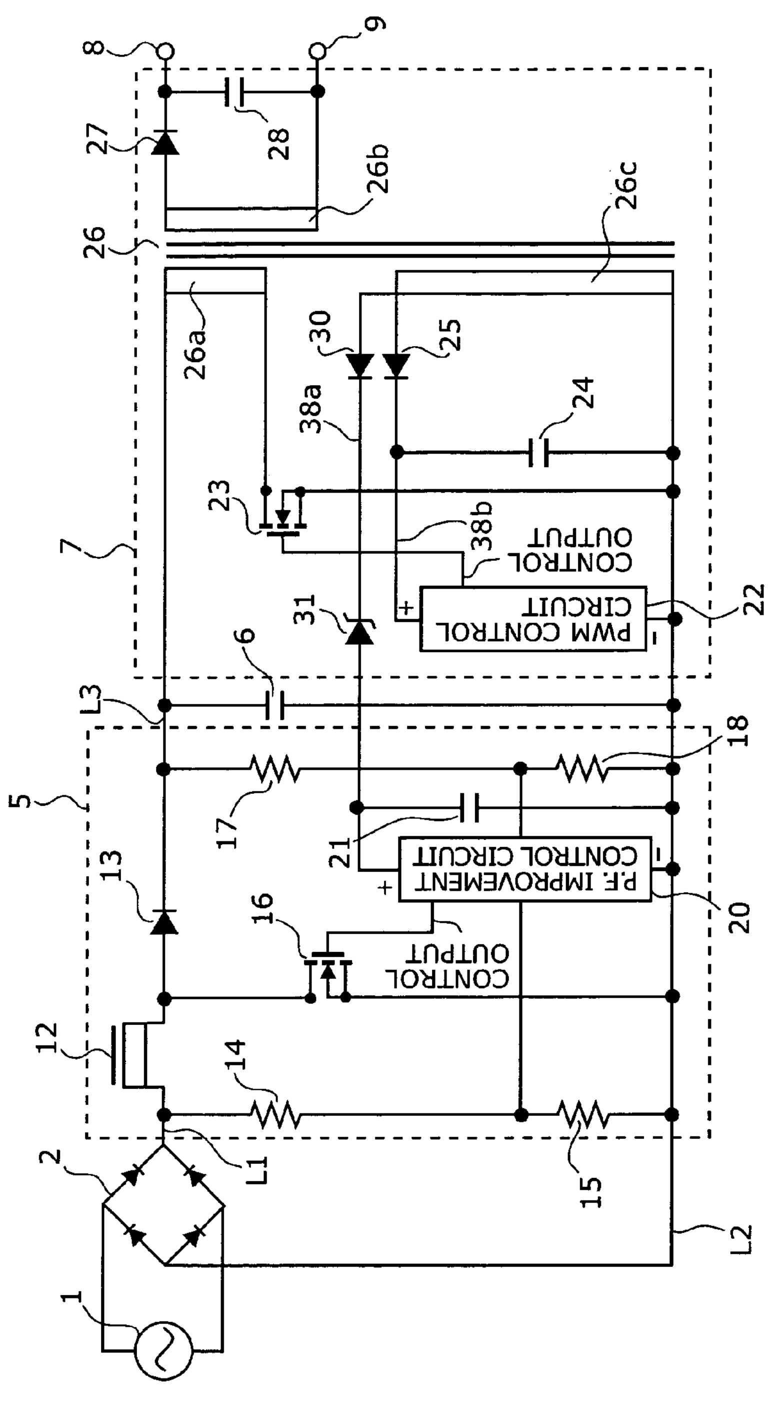
FIG. 4 is a circuit diagram of a third embodiment showing a specific configuration of the switching power supply device shown in FIG. 1.

FIG. 4 is a circuit diagram of a third embodiment showing a specific configuration of the switching power supply device shown in FIG. 1. In FIG. 4, such components as are found also in FIG. 2 are identified with the same reference symbols or numerals and descriptions thereof are not repeated accordingly.

In a switching power supply device shown in FIG. 4, a diode 30 is provided in addition to a diode 25. An anode of the diode 30 is connected to one end of an auxiliary winding 26*c* of a transformer 26, and a cathode of the diode 30 is connected to a cathode of a Zener diode 31. This means that a power-factor improvement auxiliary power 38*a* arranged for a power-factor improvement control circuit 20 is provided separately from a switching control auxiliary power 38*b* arranged for a PWM control circuit 22. A voltage induced in the auxiliary winding 26*c* is rectified and smoothed by the diode 30 and a smoothing capacitor 21 and supplied to the power-factor improvement control circuit 20 as a driving voltage.

The voltage fed from the auxiliary winding 26*c* is rectified by the diode 30, incurs a voltage drop equivalent to a Zener voltage of the Zener diode 31, and is smoothed by the smoothing capacitor 21. When the Zener voltage of the Zener diode 31 and the auxiliary winding 26*c* are set in such a way that a voltage across the smoothing capacitor 21 becomes higher than an operating voltage of the power-factor improvement control circuit 20, then power required for operating the power-factor improvement control circuit 20 is supplied thereto. As a result, a booster chopper circuit 5 comes into operation so as to improve a power factor of this switching power supply device.

Furthermore, when the switching power supply device is operating in a low-power consumption state and the PWM control circuit 22 is in an intermittent oscillation mode, in a period during which the PWM control circuit 22 stops functioning, the voltage induced in the auxiliary winding 26*c* drops. When this voltage is further reduced by being consumed as the Zener voltage of the Zener diode 31 and by the smoothing capacitor 21 and becomes lower than the operating voltage of the power-factor improvement control circuit 20, the power-factor improvement control circuit 20 stops functioning. In this way, the power loss can be further reduced. In other words, in this switching power supply device, an additional reduction of the power consumption can be achieved by stopping operating the power-factor improvement control circuit 20 during the low-power consumption state in which an improvement of the power factor is not required.

Figure 5:
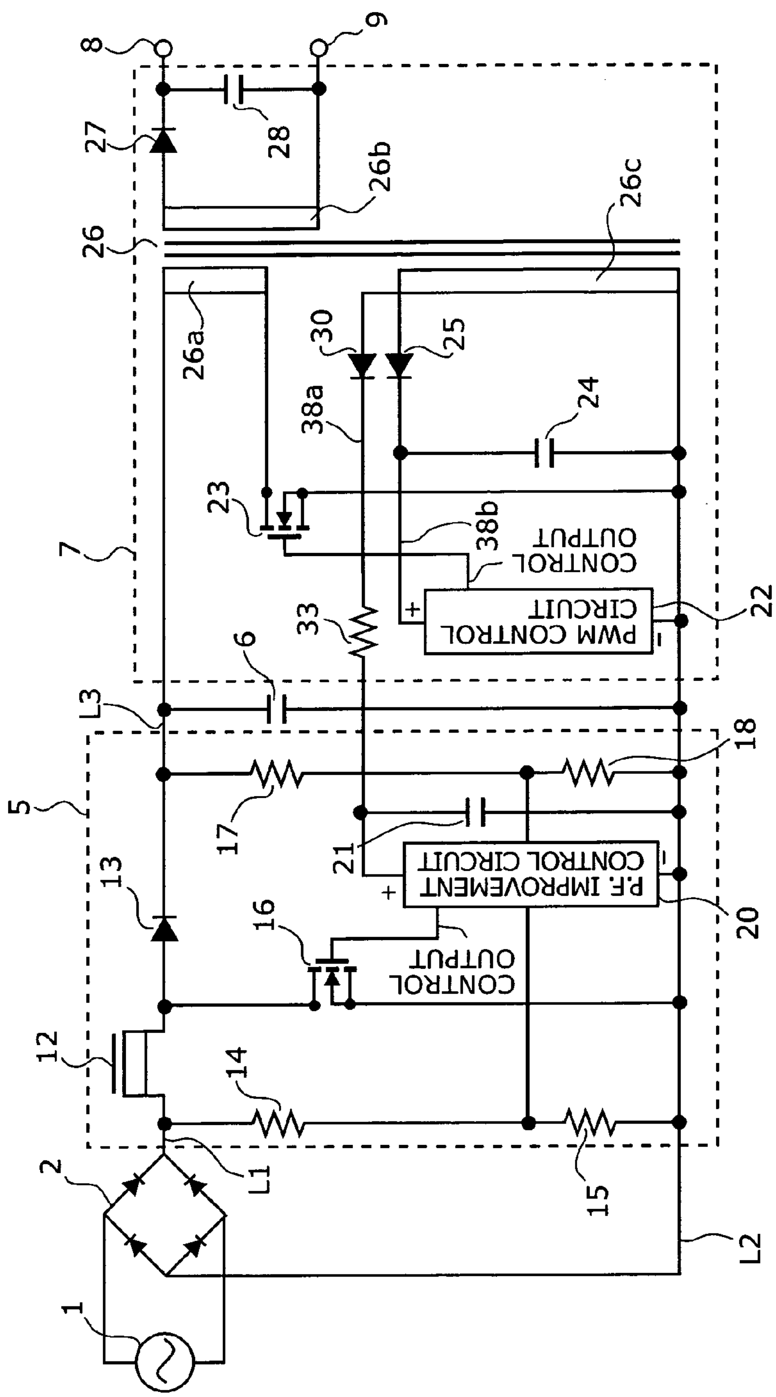
FIG. 5 is a circuit diagram of a fourth embodiment showing a specific configuration of the switching power supply device shown in FIG. 1.

FIG. 5 is a circuit diagram of a fourth embodiment showing a specific configuration of the switching power supply device shown in FIG. 1. In FIG. 5, such components as are found also in FIG. 4 are identified with the same reference symbols or numerals and descriptions thereof are not repeated accordingly.

A switching power supply device shown in FIG. 5 has a resistor 33 that replaces the Zener diode 31 of the switching power supply device shown in FIG. 4. When this switching power supply device is operating in a low-power consumption state and a PWM control circuit 22 is in an intermittent oscillation mode, in a period during which the PWM control circuit 22 stops functioning, a voltage induced in an auxiliary winding 26*c* drops. When this voltage is further reduced by being consumed as a voltage drop across the resistor 33 and by the smoothing capacitor 21 and becomes lower than an operating voltage of a power-factor improvement control circuit 20, the power-factor improvement control circuit 20 stops functioning. In this way, the power loss can be further reduced. In other words, in this switching power supply device, an additional reduction of the power consumption can be achieved by stopping operating the power-factor improvement control circuit 20 during the low-power consumption state in which an improvement of the power factor is not required.

Figure 6:
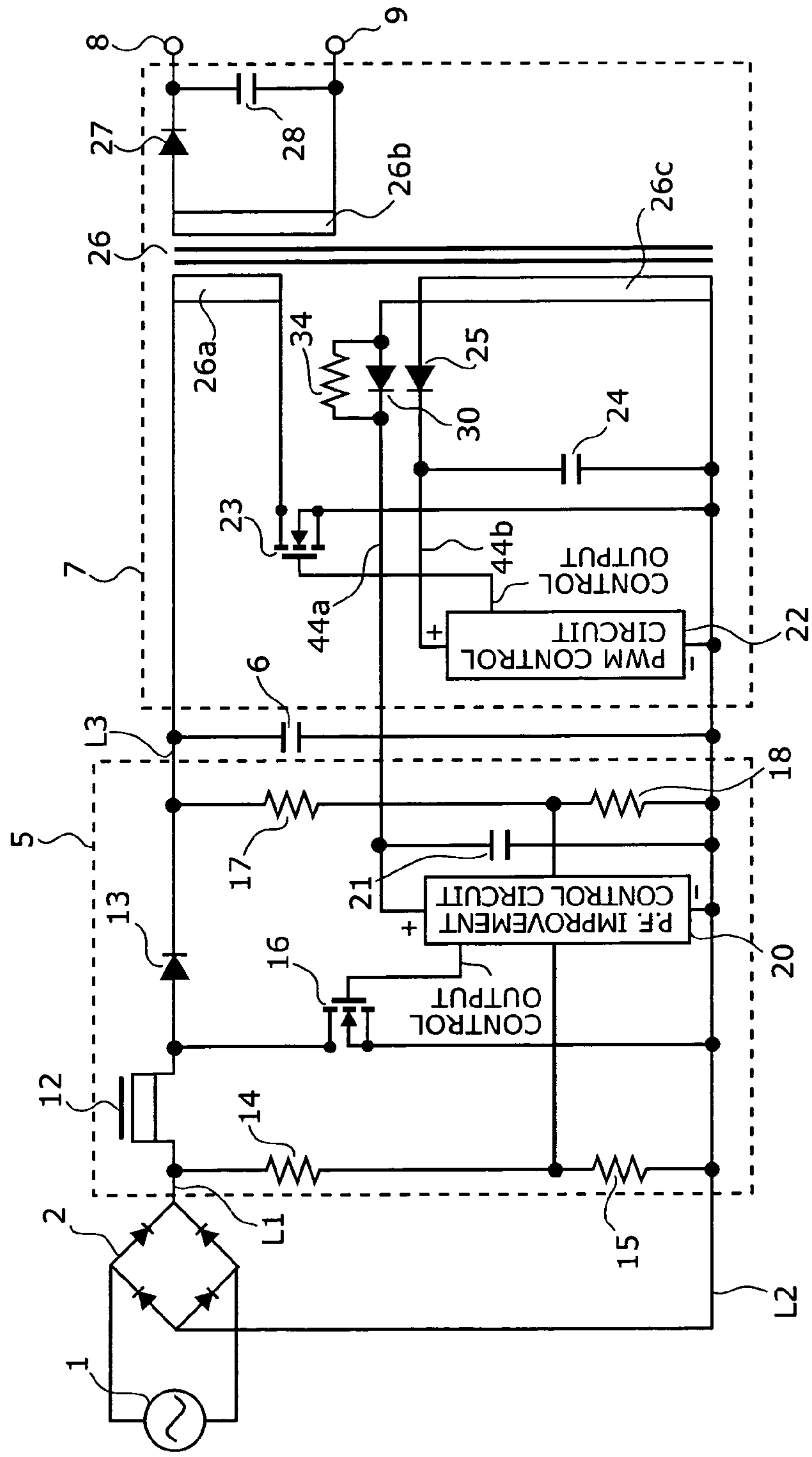
FIG. 6 is a circuit diagram of a fifth embodiment showing a specific configuration of the switching power supply device shown in FIG. 1.

FIG. 6 is a circuit diagram of a fifth embodiment showing a specific configuration of the switching power supply device shown in FIG. 1. In FIG. 6, such components as are found also in FIG. 5 are identified with the same reference symbols or numerals and descriptions thereof are not repeated accordingly.

A switching power supply device shown in FIG. 6 is configured in such a way that, based on the configuration shown in FIG. 5, the resistor 33 is removed and a resistor 34 is connected in parallel with the diode 30. A voltage induced in an auxiliary winding 26*c* of a transformer 26 is rectified and smoothed by the diode 30 and a smoothing capacitor 21 is supplied to a power-factor improvement control circuit 20 as a driving voltage in a DC voltage form. As a result, the power-factor improvement control circuit 20 starts functioning and a booster chopper circuit 5 comes into operation so as to improve a power factor of this switching power supply device.

When the switching power supply device is operating in a low-power consumption state and a PWM control circuit 22 is in an intermittent oscillation mode, in a period during which the PWM control circuit 22 stops functioning, a voltage charged the smoothing capacitor 21 is discharged to an auxiliary winding 26*c* through the resistor 34. Then, when a voltage of a power-factor improvement auxiliary power 44*a* drops and becomes lower than a operating voltage of the power-factor improvement control circuit 20, the power-factor improvement control circuit 20 stops functioning. In this way, the power loss can be further reduced. In other words, in this switching power supply device, an additional reduction of the power consumption can be achieved by stopping operating the power-factor improvement control circuit 20 during the low-power consumption state in which an improvement of the power factor is not required.

Figure 7:
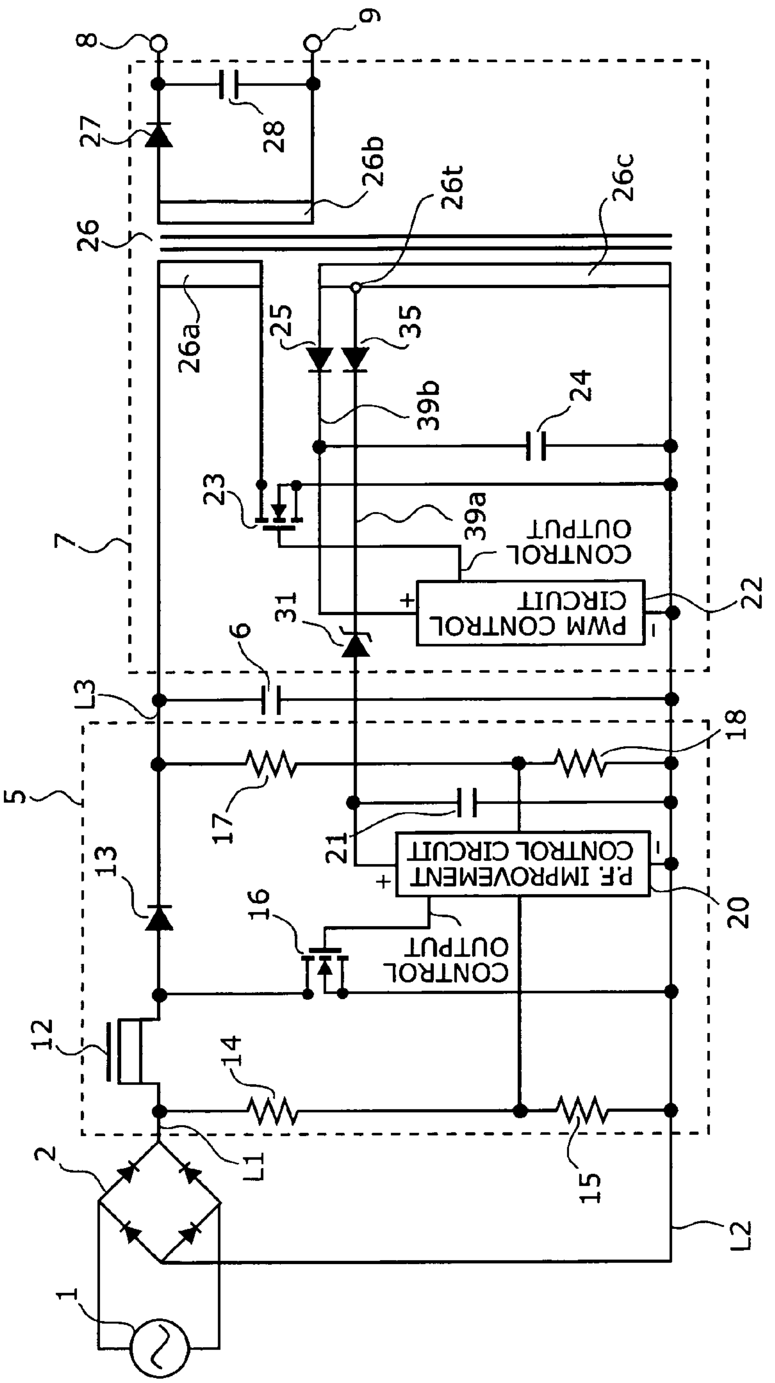
FIG. 7 is a circuit diagram of a sixth embodiment showing a specific configuration of the switching power supply device shown in FIG. 1.

FIG. 7 is a circuit diagram of a sixth embodiment showing a specific configuration of the switching power supply device shown in FIG. 1. In FIG. 7, such components as are found also in FIG. 4 are identified with the same reference symbols or numerals and descriptions thereof are not repeated accordingly.

A switching power supply device shown in FIG. 7 is an improved version of the switching power supply device shown in FIG. 4. In the switching power supply device shown in FIG. 4, let's assume that, for example, the voltage of the power-factor improvement auxiliary power 38 under normal operating load is 15 V and the voltage by and below which the power-factor improvement control circuit 20 and the PWM control circuit 22 stop functioning is 12 V. When the voltage of the power-factor improvement auxiliary power 38 during the low-power consumption state drops to as low as 13 V, the driving voltage supplied to the power-factor improvement control circuit 20 will be below 12 V if the Zener diode 31 having a Zener voltage of 1 V or more is chosen. As a result, it becomes possible to stop operating the power-factor improvement control circuit 20.

Let's assume that the voltage by which the power-factor improvement control circuit 20 and the PWM control circuit 22 stop functioning are 5 V and 12 V respectively. When the auxiliary winding 26*c* alone is used for supplying the driving voltage, the voltage necessary for stopping operating the power-factor improvement control circuit 20 will be 8V (13

V, the voltage of the power-factor improvement auxiliary power 38 in the low-power consumption state —5 V, the voltage by which the power-factor improvement control circuit 20 stops functioning). This means that a Zener diode 31 having a Zener voltage of 8 V or more is necessary.

However, if the Zener diode 31 has a Zener voltage of 8 V or more, power consumed by the Zener diode 31 becomes larger. To cope with this problem, as shown in FIG. 7, the switching power supply device is provided with a transformer 26 having a tap 26*t* on an auxiliary winding 26*c* for producing a voltage used for a power-factor improvement auxiliary power 39*a* that is supplied to a power-factor improvement control circuit 20. To do so, the voltage fed from the tap 26*t* is rectified and smoothed by a diode 35 and a capacitor 21.

Let's assume that, for example, the voltage of the power-factor improvement auxiliary power 39*a* under normal operating load is 9 V. When the voltage of the power-factor improvement auxiliary power 39*a* during the low-power consumption state drops to as low as 7 V, the voltage supplied to the power-factor improvement control circuit 20 becomes below 5 V if a Zener diode 31 having a Zener voltage of 2 V or more is chosen. As a result, the power-factor improvement control circuit 20 stops functioning, power consumed by the Zener diode 31 is reduced, and an input power loss is also reduced. In other words, in this switching power supply device, it is possible to stop operating the power-factor improvement control circuit 20 during the low-power consumption state, reduce the power consumed by the Zener diode 31, and thereby achieve further reduction of power.

Figure 8:
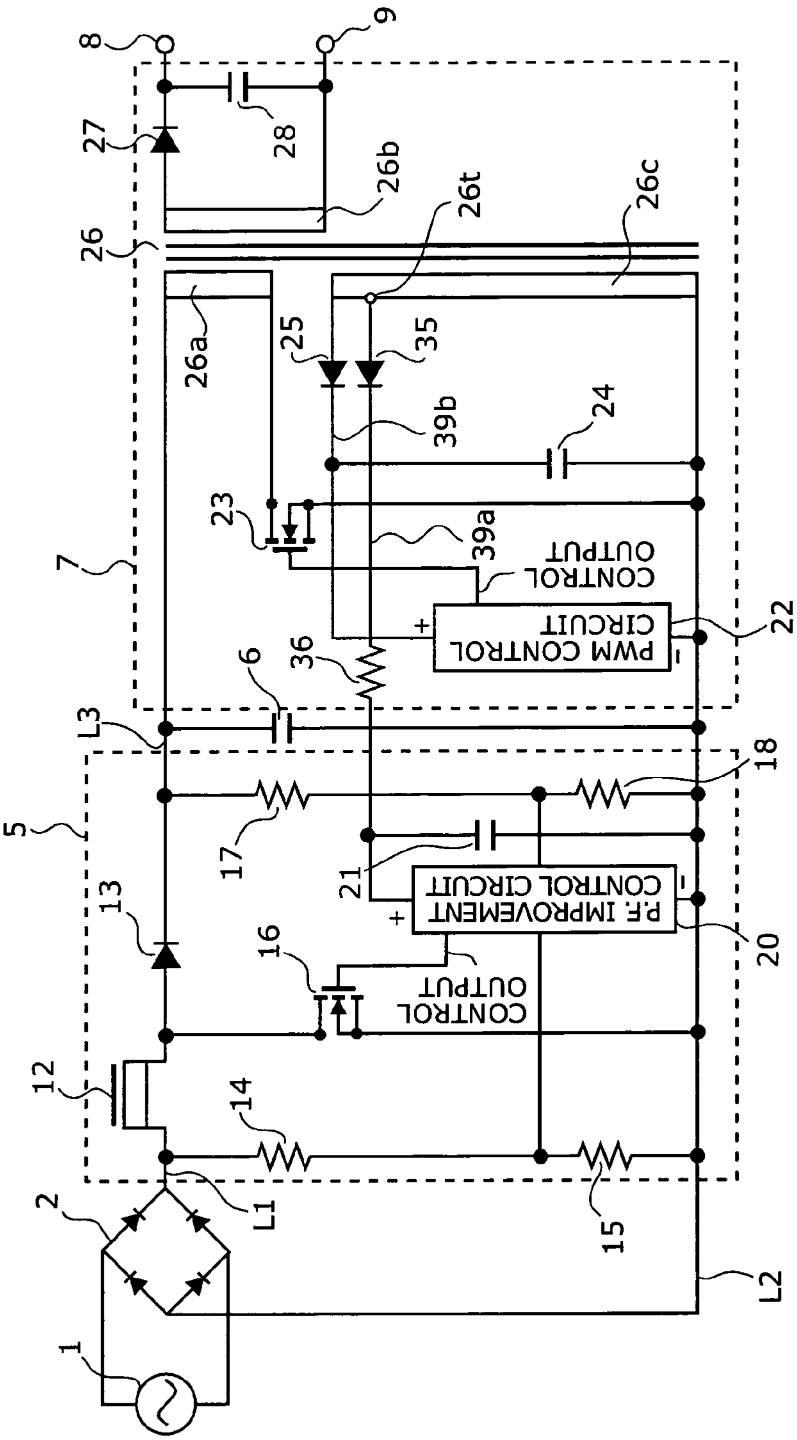
FIG. 8 is a circuit diagram of a seventh embodiment showing a specific configuration of the switching power supply device shown in FIG. 1.

FIG. 8 is a circuit diagram of a seventh embodiment showing a specific configuration of the switching power supply device shown in FIG. 1. In FIG. 8, such components as are found also in FIG. 5 are identified with the same reference symbols or numerals and descriptions thereof are not repeated accordingly.

A switching power supply device shown in FIG. 8 is an improved version of the switching power supply device shown in FIG. 5. In the switching power supply device shown in FIG. 5, let's assume that, for example, the voltage of the power-factor improvement auxiliary power 38*a* under normal operating load is 15 V and the voltage by and below which the power-factor improvement control circuit 20 and the PWM control circuit 22 stop functioning is 12 V. When the voltage of the power-factor improvement auxiliary power 38*a* during the low-power consumption state drops to as low as 13 V and current consumed by the power-factor improvement control circuit 20 is 100 mA, the resistor 36 should bear a voltage drop of 1 V (13 V, the voltage of the power-factor improvement auxiliary power 38*a* in the low-power consumption state—12 V, the voltage by which the power-factor improvement control circuit 20 stops functioning). This means that a resistance value required for the resistor 36 is 10 ohms (1 V÷100 mA). Therefore, the driving voltage supplied to the power-factor improvement control circuit 20 becomes less than 12 V by setting the resistance of the resistor 36 at 10 ohms or higher. As a result, it becomes possible to stop operating the power-factor improvement control circuit 20.

However, let's assume that the voltage by which the power-factor improvement control circuit 20 and the PWM control circuit 22 stop functioning are 5 V and 12 V respectively. When the auxiliary winding 26*c* alone is used for supplying the driving voltage, the voltage necessary for stopping operating the power-factor improvement control circuit 20 will be 8V (13 V, the voltage of the power-factor improvement auxiliary power 38*a* in the low-power consumption state—5 V, the voltage by which the power-factor improvement control circuit 20 stops functioning). This means that the resistor 36 should bear a voltage drop of 8 V or higher, a resistance thereof will be 80 ohms (8 V÷100 mA) or higher, and power consumed thereby will be 0.8 W (8 V×100 mA).

To cope with this problem, the switching power supply device shown in FIG. 8 is provided with a transformer 26 having a tap 26*t* on an auxiliary winding 26*c* for producing a voltage used for a power-factor improvement auxiliary power 39*a* that is supplied to a power-factor improvement control circuit 20. To do so, the voltage fed from the tap 26*t* is rectified and smoothed by a diode 35 and a capacitor 21.

Let's assume that, for example, the voltage of the power-factor improvement auxiliary power 39*a* under normal operating load is 9 V. When the voltage of the power-factor improvement auxiliary power 39*a* during the low-power consumption state drops to as low as 7 V, the voltage supplied to the power-factor improvement control circuit 20 becomes below 5 V, if the resistance of the resistor 31 is set at 20 ohms or higher so as to reduce the voltage supplied to the power-factor improvement control circuit 20 by 2 V or more. As a result, the power-factor improvement control circuit 20 stops functioning, power consumed by the resistor 36 is reduced to 0.2 W, and an input power loss is also reduced. In other words, in this switching power supply device, it is possible to stop operating the power-factor improvement control circuit 20 during the low-power consumption state in which the power-factor improvement is not required, reduce the power consumed by the resistor 36, and thereby achieve further reduction of power.

Figure 9:
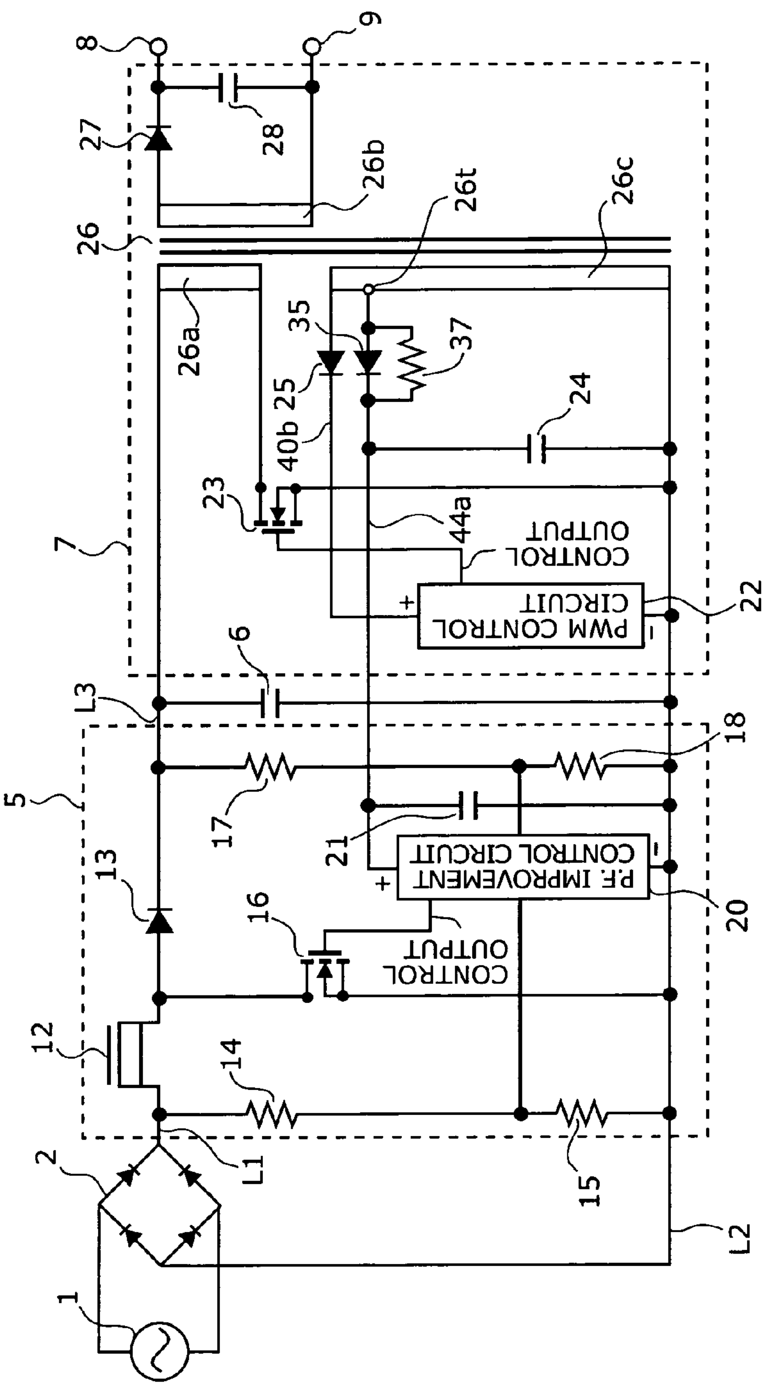
FIG. 9 is a circuit diagram of an eighth embodiment showing a specific configuration of the switching power supply device shown in FIG. 1.

FIG. 9 is a circuit diagram of an eighth embodiment showing a specific configuration of the switching power supply device shown in FIG. 1. In FIG. 9, such components as are found also in FIG. 6 are identified with the same reference symbols or numerals and descriptions thereof are not repeated accordingly.

A switching power supply device shown in FIG. 9 is an improved version of the switching power supply device shown in FIG. 6. In the switching power supply device shown in FIG. 6, let's assume that, for example, the voltage of the power-factor improvement auxiliary power 44*a* under normal operating load is 15 V and the voltage by and below which the power-factor improvement control circuit 20 and the PWM control circuit 22 stop functioning is 12 V. When the voltage of the power-factor improvement auxiliary power 44*a* during the low-power consumption state drops to as low as 13 V, it is possible to stop operating the power-factor improvement control circuit 20 during the low-power consumption state by setting a resistance of the resistor 34 at such a value by which the power-factor improvement auxiliary power 44*a* incurs a voltage drop of 1 V or more when electricity discharges through the resistor 34 while the PWM control circuit 22 is not operating during the intermittent oscillation mode in the low-power consumption state.

However, in a case in which the voltage by and below which the power-factor improvement control circuit 20 stops operating is low, for example, 5 V, in order to stop operating the power-factor improvement control circuit 20, the power-factor improvement auxiliary power 44*a* should incur a voltage drop of 8 V when electricity discharges through the resistor 34 while the PWM control circuit 22 is not operating during the intermittent oscillation mode in the low-power consumption state. This means that the resistance of the resistor 34 should be set at a smaller value, which eventually makes the power consumed by the resistor 34 larger.

To cope with this problem, the switching power supply device shown in FIG. 9 is provided with a transformer 26 having a tap 26*t* on an auxiliary winding 26*c* for producing a voltage used for a power-factor improvement auxiliary power 40*a*. Let's assume that, for example, the voltage of the power-factor improvement auxiliary power 40*a* under normal operating load is 9 V. When the voltage of the power-factor improvement auxiliary power 40*a* during the low-power consumption state drops to as low as 7 V, it is possible to stop operating the power-factor improvement control circuit 20 by providing a voltage drop of 2 V or more across a resistor 37 and reduce the power consumed by the resistor 37.

When a PWM control circuit 22 falls into an intermittent oscillation mode during a low-power consumption state and while the PWM control circuit 22 is not operating, a voltage of the power-factor improvement auxiliary power 40*a* drops because electricity charged in a smoothing capacitor 21 is discharged to the auxiliary winding 26*c* through the resistor 37. When the voltage of the power-factor improvement auxiliary power 40*a* drops to or below an operating voltage of the power-factor improvement control circuit 20, the power-factor improvement control circuit 20 stops functioning and a power loss thereby is reduced. In other words, in this switching power supply device, it is possible to stop operating the power-factor improvement control circuit 20 during the low-power consumption state in which the power-factor improvement is not required, reduce the power consumed by the resistor 37, and thereby achieve further reduction of power.

Figure 10:
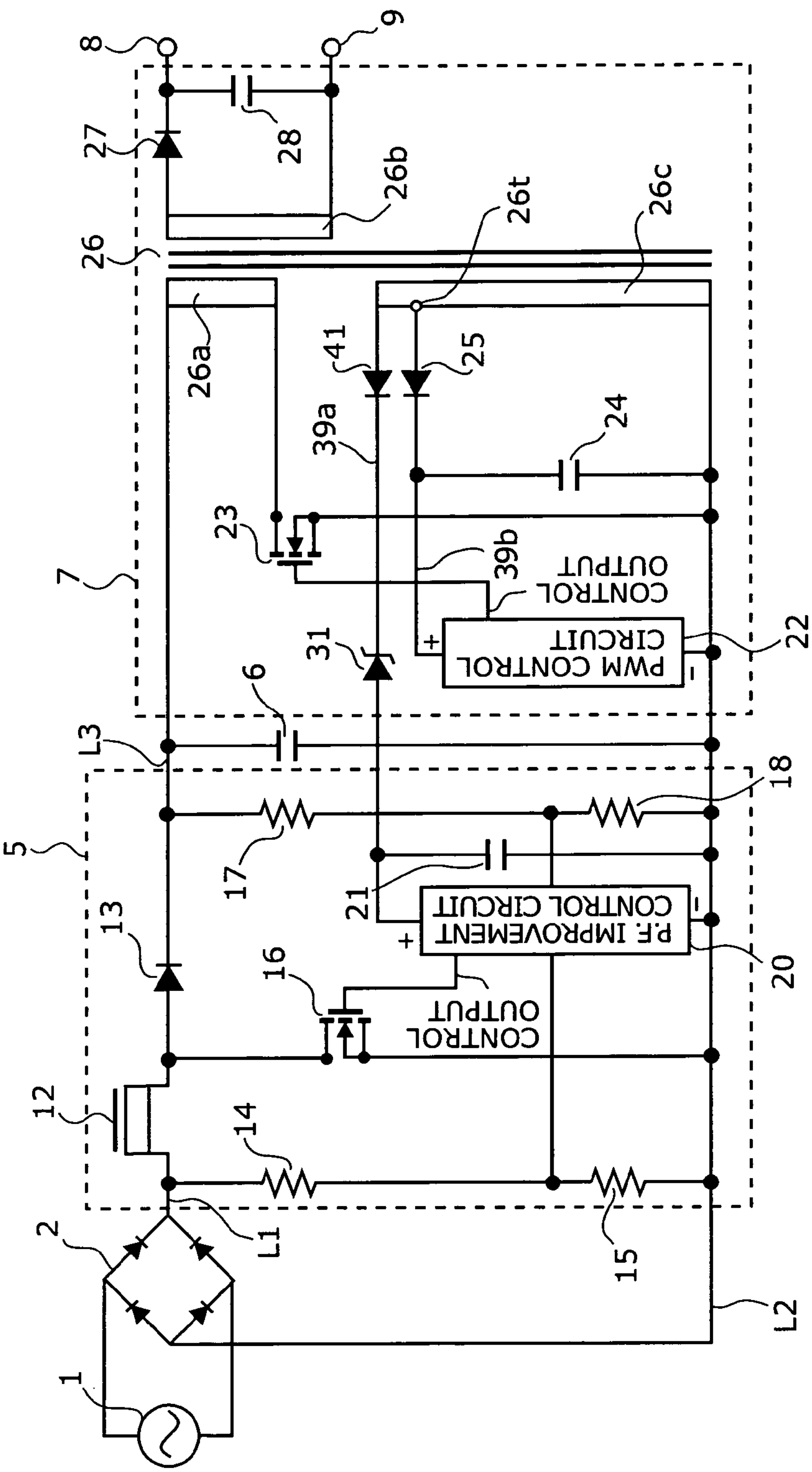
FIG. 10 is a circuit diagram of a ninth embodiment showing a specific configuration of the switching power supply device shown in FIG. 1.

FIG. 10 is a circuit diagram of a ninth embodiment showing a specific configuration of the switching power supply device shown in FIG. 1. In FIG. 10, such components as are found also in FIG. 4 are identified with the same reference symbols or numerals and descriptions thereof are not repeated accordingly.

A switching power supply device shown in FIG. 10 is an improved version of the switching power supply device shown in FIG. 4. In the switching power supply device shown in FIG. 4, let's assume that, for example, the voltage of the power-factor improvement auxiliary power 38*a* under normal operating load is 15 V and the voltage by and below which the power-factor improvement control circuit 20 and the PWM control circuit 22 stop functioning is 12 V. When the voltage of the power-factor improvement auxiliary power 38*a* during the low-power consumption state drops to as low as 13 V, it is possible to stop operating the power-factor improvement control circuit 20 by providing the Zener diode 31 having a Zener voltage of 1 V or higher so that the voltage supplied to the power-factor improvement control circuit 20 will be 12 V or less.

However, in a case in which the operating voltages of the power-factor improvement control circuit 20 and the PWM control circuit 22 are 12 V and 6 V respectively, when the driving voltage is supplied from the common auxiliary winding 26*c*, an unnecessarily high voltage will be supplied to the PWM control circuit 22 and the power consumed thereby will be also increased.

To cope with this problem, the switching power supply device shown in FIG. 10 is provided with a transformer 26 having a tap 26*t* on an auxiliary winding 26*c* for producing a voltage used for operating a PWM control circuit 22. Let's assume that a voltage of a power-factor improvement auxiliary power 39*b* under normal operating load is 9 V. It is possible to reduce the power consumed by the PWM control circuit 22 by setting a voltage at the tap 26*t* so that the PWM control circuit 22 operates even when the voltage of the power-factor improvement auxiliary power 39*b* during the low-power consumption state drops to, for example, as low as 7 V. In addition, by providing a Zener diode 31 having a Zener voltage of 1 V or higher in a line of the power-factor improvement auxiliary power 39*a* leading to the power-factor improvement control circuit 20, it is possible to reduce the voltage of the power-factor improvement auxiliary power 39*a* to as low as 13 V during the low-power consumption state, cause an input voltage applied to the power-factor improvement control circuit 20 to go below the operating voltage, stop operating the power-factor improvement control circuit 20, and reduce power consumption thereof.

In other words, in this switching power supply device, it is possible to stop operating the power-factor improvement control circuit 20 during the low-power consumption state in which the power-factor improvement is not required, reduce the power consumed by the PWM control circuit 22 during the low-power consumption state, and thereby achieve further reduction of power.

Figure 11:
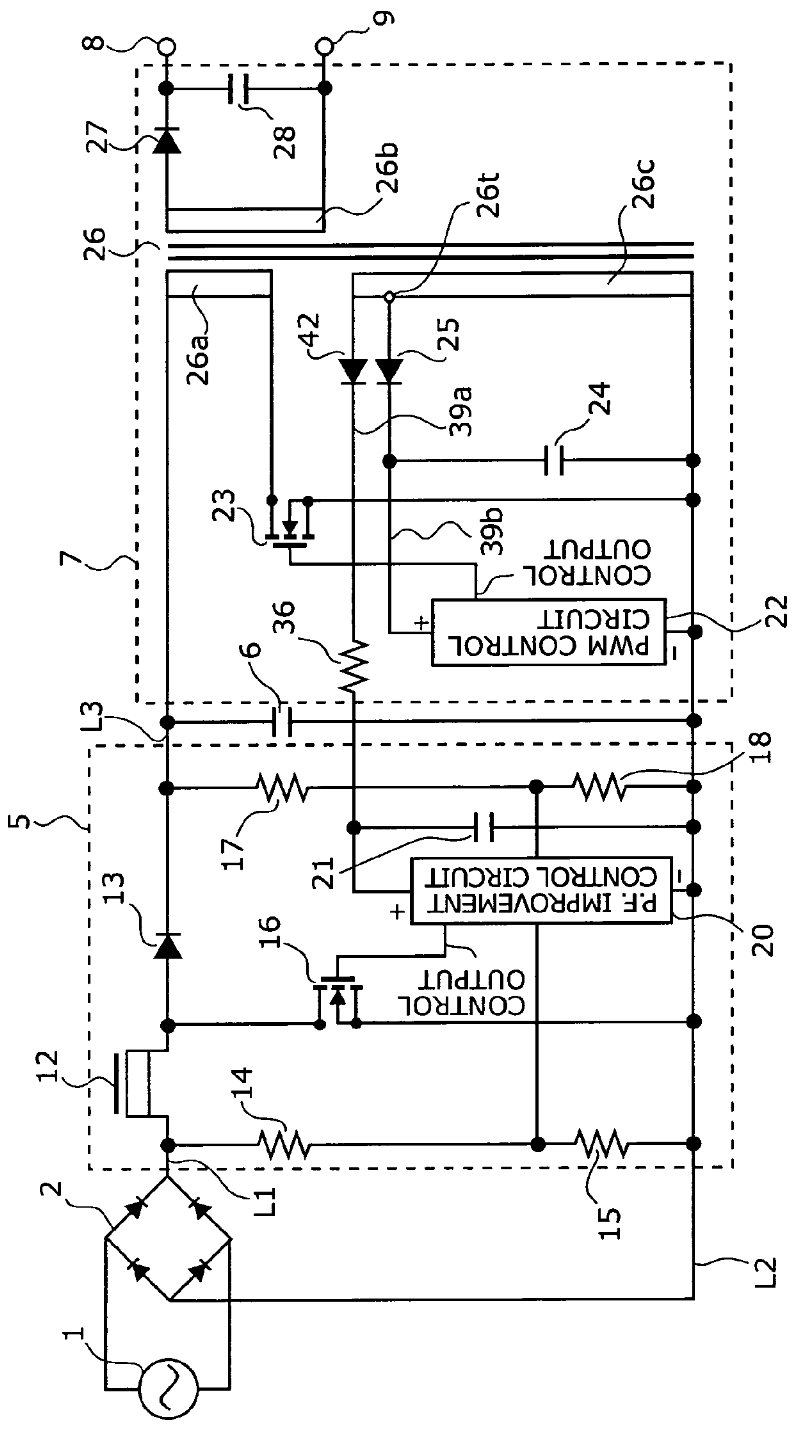
FIG. 11 is a circuit diagram of a tenth embodiment showing a specific configuration of the switching power supply device shown in FIG. 1.

FIG. 11 is a circuit diagram of a tenth embodiment showing a specific configuration of the switching power supply device shown in FIG. 1. In FIG. 11, such components as are found also in FIG. 5 are identified with the same reference symbols or numerals and descriptions thereof are not repeated accordingly.

A switching power supply device shown in FIG. 11 is an improved version of the switching power supply device shown in FIG. 5. In the switching power supply device shown in FIG. 5, let's assume that the operating voltages of the power-factor improvement control circuit 20 and the PWM control circuit 22 are 12 V and 6 V respectively. When the driving voltage is supplied from the common auxiliary winding 26*c*, an unnecessarily high voltage will be supplied to the PWM control circuit 22 and the power consumed thereby will be also increased.

To cope with this problem, the switching power supply device shown in FIG. 11 is provided with a transformer 26 having a tap 26*t* on an auxiliary winding 26*c* for producing a voltage used for a switching control auxiliary power 39*b* to be supplied to a PWM control circuit 22. Let's assume that the voltage of the switching control auxiliary power 39*b* under normal operating load is 9 V. It is possible to reduce the power consumed by the PWM control circuit 22 by adjusting the voltage at the tap 26*t* so that the PWM control circuit 22 operates even when the voltage of the switching control auxiliary power 39*b* during a low-power consumption state drops to, for example, as low as 7 V.

In addition, by providing a resistor 36 that incurs a voltage drop of 1 V or higher in a line of the power-factor improvement auxiliary power 39*a* supplied to the power-factor improvement control circuit 20, it is possible to reduce the voltage of the power-factor improvement auxiliary power 39*a* to as low as 13 V during the low-power consumption state, cause an input voltage applied to the power-factor improvement control circuit 20 to go below the operating voltage thereof, stop operating the power-factor improvement control circuit 20, and reduce power consumption thereof. In other words, in this switching power supply device, it is possible to stop operating the power-factor improvement control circuit 20 during the low-power consumption state in which the power-factor improvement is not required, reduce the power consumed by PWM control circuit 22 during the low-power consumption state, and thereby achieve further reduction of power consumption.

Figure 12:
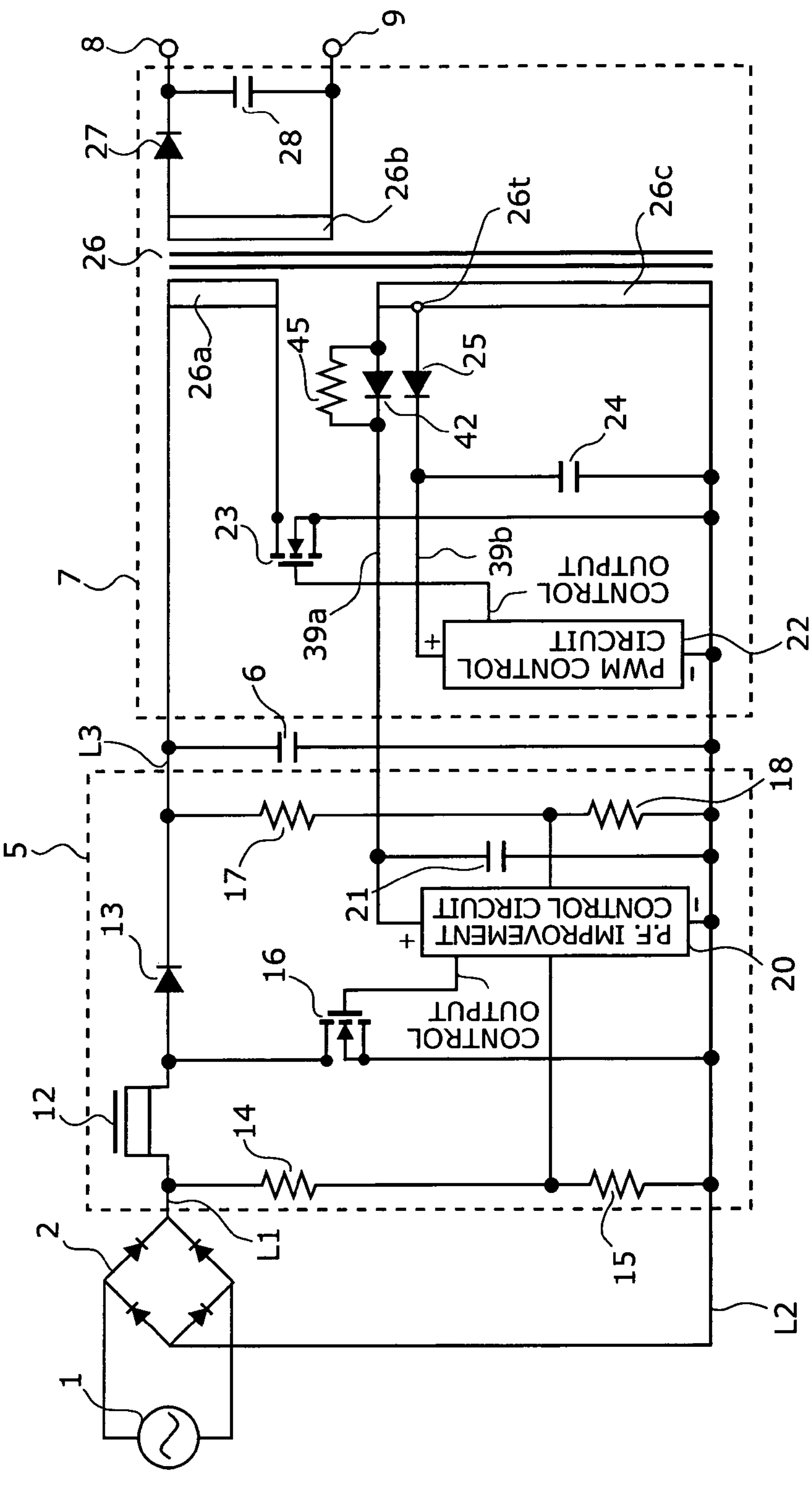
FIG. 12 is a circuit diagram of an eleventh embodiment showing a specific configuration of the switching power supply device shown in FIG. 1.

FIG. 12 is a circuit diagram of a tenth embodiment showing a specific configuration of the switching power supply device shown in FIG. 1. In FIG. 12, such components as are found also in FIG. 6 are identified with the same reference symbols or numerals and descriptions thereof are not repeated accordingly.

A switching power supply device shown in FIG. 12 is an improved version of the switching power supply device shown in FIG. 6. In the switching power supply device shown in FIG. 6, let's assume that the operating voltages of the power-factor improvement control circuit 20 and the PWM control circuit 22 are 12 V and 6 V respectively. When the driving voltage is supplied from the common auxiliary winding 26*c*, an unnecessarily high voltage will be supplied to the PWM control circuit 22 and the power consumed thereby will be also increased.

To cope with this problem, the switching power supply device shown in FIG. 11 is provided with a transformer 26 having a tap 26*t* on an auxiliary winding 26*c* for producing a voltage used for a switching control auxiliary power 39*b* supplied to a PWM control circuit 22. Let's assume that the voltage of the switching control auxiliary power 39*b* under normal operating load is 9 V. It is possible to reduce the power consumed by the PWM control circuit 22 by adjusting a voltage at the tap 26*t* so that the PWM control circuit 22 operates even when the voltage of the switching control auxiliary power 39*b* during the low-power consumption state drops to, for example, as low as 7 V.

When the PWM control circuit 22 falls into an intermittent oscillation mode during the low-power consumption state and while the PWM control circuit 22 is not operating, a voltage of the power-factor improvement auxiliary power 39*a* drops because electricity charged in a smoothing capacitor 21 is discharged to the auxiliary winding 26*c* through a resistor 45. When the voltage of the power-factor improvement auxiliary power 39*a* drops to or below the operating voltage of the power-factor improvement control circuit 20, the power-factor improvement control circuit 20 stops functioning and the power loss thereby reduces. In other words, in this switching power supply device, it is possible to stop operating the power-factor improvement control circuit 20 during the low-power consumption state in which the power-factor improvement is not required, reduce the power consumed by PWM control circuit 22 during the low-power consumption state, and thereby achieve further reduction of power consumption.

According to the present invention, the operating voltage is supplied to the power-factor improvement control circuit when the switching power supply device is operating under normal operating load. Thereby, the booster chopper circuit is controlled by the power-factor improvement control circuit so as to improve the power factor of the device. By contrast, during a non-oscillation period while the switching control circuit is in an intermittent oscillation mode when the power consumption is small, the voltage induced in the auxiliary winding drops. Accordingly, the voltage of the auxiliary power supply also drops. Furthermore, when the driving voltage to be supplied to the power-factor improvement control circuit is reduced below the operating voltage thereof by the voltage reduction circuit, the power-factor improvement control circuit stops functioning, thereby reducing power consumption accordingly.

What is claimed is:

1. A switching power supply device comprising:

a booster chopper circuit for receiving a first DC voltage and converting the first DC voltage to a second DC voltage for outputting, the booster chopper circuit including a power-factor improvement control circuit for improving a power factor;

a series circuit to which the second DC voltage is supplied and comprising a primary winding of a transformer and a switching element;

a switching control circuit for performing an oscillation function so as to drive and control the switching element so that a secondary winding of the transformer induces a voltage that is then rectified, smoothed, and supplied to a load as a third DC voltage, the switching control circuit for performing also, when the load is smaller than a predetermined value, an intermittent-oscillation function by which an oscillation period and a non-oscillation period are repeated;

an auxiliary power supply for supplying a voltage induced in an auxiliary winding of the transformer when the switching element is driven by the switching control circuit as a driving voltage by processing the induced voltage through rectifying and smoothing to the power-factor improvement control circuit and the switching control circuit; and a voltage reduction circuit for lowering the driving voltage, wherein, during the non-oscillation period when the load is smaller than the predetermined value and the switching control circuit is performing the intermittent-oscillation function, the driving voltage supplied to the power-factor improvement control circuit drops below an operating voltage thereof through a voltage drop caused by the voltage reduction circuit and causes the power-factor improvement control circuit to stop operating so that power consumption is reduced.

2. A switching power supply device as claimed in claim 1, wherein the auxiliary power supply comprises a first auxiliary power supply for driving the power-factor improvement control circuit and a second auxiliary power supply for driving the switching control circuit.

3. A switching power supply device as claimed in claim 2, wherein a voltage across the auxiliary winding is fed to the second auxiliary power supply and a voltage fed from a tap arranged on the auxiliary winding is fed to the first auxiliary power supply, and wherein the voltage reduction circuit is arranged in between the power-factor improvement control circuit and the first auxiliary power supply.

4. A switching power supply device as claimed in claim 2, wherein a voltage across the auxiliary winding is fed to the first auxiliary power supply and a voltage fed from a tap arranged on the auxiliary winding is fed to the second auxiliary power supply, and wherein the voltage reduction circuit is arranged in between the power-factor improvement control circuit and the first auxiliary power supply.

5. A switching power supply device as claimed in claim 2, wherein a voltage across the auxiliary winding is fed to the second auxiliary power supply and a voltage fed from a tap arranged on the auxiliary winding is fed to the first auxiliary power supply.

6. A switching power supply device as claimed in claim 2, wherein the voltage reduction circuit comprises a resistor, connected in parallel with a diode that forms the first auxiliary power supply, for lowering the driving voltage.

7. A switching power supply device as claimed in claim 1, wherein the voltage reduction circuit comprises a resistor for lowering the driving voltage.

8. A switching power supply device as claimed in claim 1, wherein the voltage reduction circuit comprises a Zener diode for lowering the driving voltage.

* * * * *